United States Patent [19]

Cavagnolo et al.

[11] Patent Number: 4,999,759
[45] Date of Patent: Mar. 12, 1991

[54] MULTIPLE OUTPUT SWITCHING POWER SUPPLY HAVING ONE CONTROLLED OUTPUT VOLTAGE AND LOAD COMPENSATION

[76] Inventors: Gian P. Cavagnolo, Via Caterina da Forlì 28, Milano 20100; Alessandro Scotti, Via Genova 23, 20010 Pregnana Milanese, both of Italy

[21] Appl. No.: 556,608

[22] Filed: Jul. 20, 1990

[30] Foreign Application Priority Data

Sep. 27, 1989 [IT] Italy .................... 21840 A/89

[51] Int. Cl.⁵ .................... H02M 3/335; G05F 1/577
[52] U.S. Cl. .................... 363/21; 363/97; 323/267
[58] Field of Search .................... 323/266, 267; 363/20, 363/21, 24, 25, 95, 97, 131, 134; 307/12, 17, 31–35, 38, 39

[56] References Cited

U.S. PATENT DOCUMENTS

| | | | |
|---|---|---|---|
| 3,790,878 | 2/1974 | Brokaw | 323/267 X |
| 4,122,514 | 10/1978 | Amin | 363/21 |
| 4,419,723 | 12/1983 | Wilson, Jr. | 363/21 |
| 4,646,217 | 2/1987 | Baroni et al. | 363/26 X |
| 4,660,136 | 4/1987 | Montorefano | 323/267 X |

Primary Examiner—Peter S. Wong
Assistant Examiner—Emanuel Todd Voeltz
Attorney, Agent, or Firm—John S. Solakian; James H. Phillips

[57] ABSTRACT

A multiple output switching power supply having one controlled output and load compensation, where periodical voltage pulses, induced in at least two secondary windings of a transformer, load two buffer capacitive elements, each connected between ground and, respectively a first and a second output terminal at two different, like sign voltages and makes available two output voltages V1, V2, one of which (V1) is controlled, at first and second output terminals, respectively, and where the capacitive element connected between ground and the first terminal includes two series connected capacitors having respective values such that a voltage slightly higher than V2 in absolute value is imparted to the node common to the two capacitors. The node is connected to the second output terminal through a diode conductive in the direction which allows the electric charge stored in the first capacitive element to flow towards the second terminal and the second capacitive element when the output voltage V2 decreases in absolute value.

2 Claims, 1 Drawing Sheet

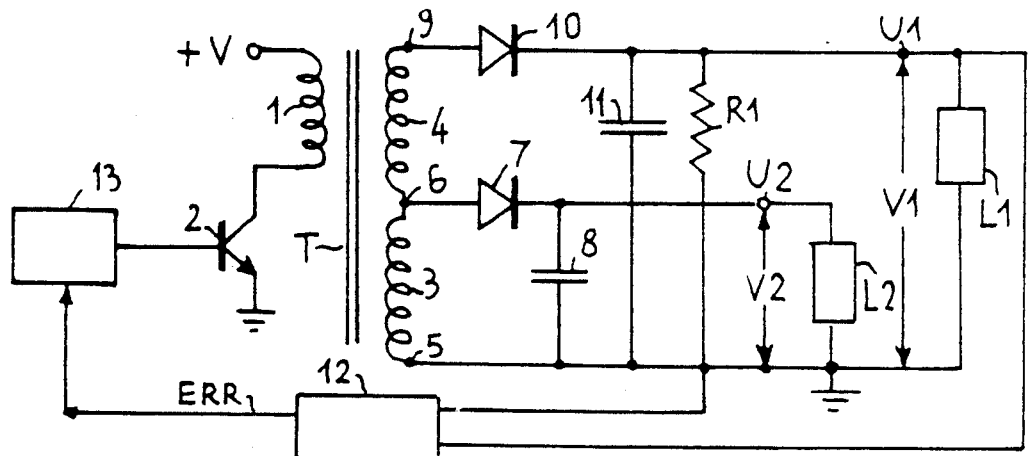
FIG.1 [PRIOR ART]
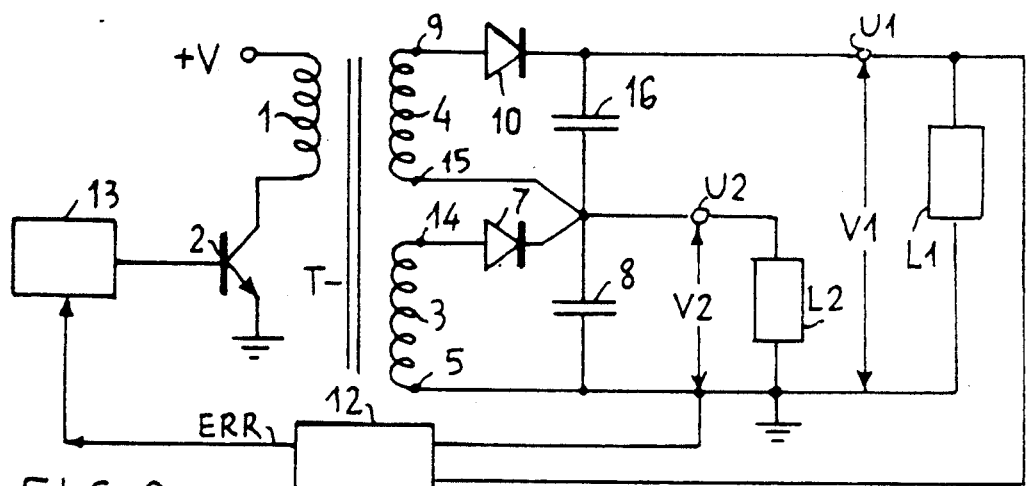
FIG.2 [PRIOR ART]
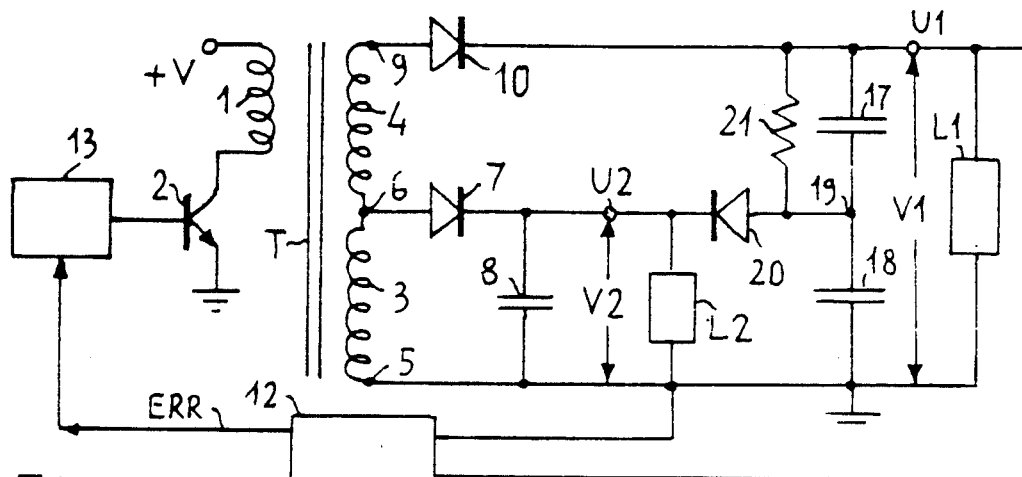
FIG.3

MULTIPLE OUTPUT SWITCHING POWER SUPPLY HAVING ONE CONTROLLED OUTPUT VOLTAGE AND LOAD COMPENSATION

FIELD OF THE INVENTION

The present invention relates to multiple output switching power supplies having one controlled output voltage.

BACKGROUND OF THE INVENTION

Multiple output switching power supplies are known in which an unregulated d-c voltage (typically obtained from a rectified a-c voltage source) is periodically applied through switches to the primary winding of a transformer so as to induce voltage pulses in a plurality of secondary windings. The induced voltage pulses charge, through diodes, capacitors connected to the output of the secondary windings. The capacitors act as buffer filters, and relatively constant d-c voltages are available at their terminals. These voltages may be used to power loads.

By comparing the voltage available at the terminals of one of such filter capacitors with a reference voltage, an error signal is obtained which is used to control, through switchable devices, the frequency and/or the duty cycle of the voltage and current pulses applied to the primary winding in order to regulate the voltage at the terminals of one capacitor, thus of one output. Absent any independent control circuit for the other outputs, the charge voltage of the other capacitors, and hence the voltage available at the other outputs, is indirectly regulated and is largely affected by the load conditions of the several outputs in both static and transient situations.

To overcome this disadvantage, several solutions are known. They will be considered in detail in the following, but, in any event, they are not completely satisfactory, particularly in dynamic conditions of load variation. One of these known solutions provides for a series connection among outputs and requires the use of components sized to sustain the sum of the loads connected to the outputs. In addition the voltage ripple which affects the indirectly regulated output is the sum of the intrinsic ripple voltages and the one affecting the regulated output. Further in case of transient load peaks at the regulated output, a relevant voltage drop occurs at the indirectly regulated output.

SUMMARY OF THE INVENTION

These drawbacks are overcome by the multiple output power supply of the invention where the filter and buffer capacitance of a first regulated voltage output includes two series connected capacitors. The capacitances of the two capacitors are selected so as to obtain, at the connection node of the two capacitors, a voltage equal to or slightly higher than the voltage at the second output. The node connecting the two capacitors is connected to the second output through a diode which enables power flowing from one of the capacitors to the second output if the voltage at the second output decreases. The diode prevents coupling of the outputs if the voltage at the regulated output decreases due to load peaks.

DESCRIPTION OF THE DRAWING

The features and the advantages of the invention will appear more clearly from the following description of a preferred form of embodiment and from the enclosed drawing where:

FIG. 1 is a block diagram of a first multiple output power supply known from the prior art;

FIG. 2 is a block diagram of a second multiple output power supply known from the prior art; and FIG. 3 is a block diagram of a preferred form of embodiment of a multiple output power supply according to the present invention.

DETAILED DESCRIPTION OF THE INVENTION

FIG. 1 shows a multiple output power supply known from the prior art. An unregulated d-c voltage $+V$ is applied to a terminal of a primary winding 1 of a transformer T. The other terminal is periodically connected to ground through a switching transistor 2. Two secondary windings 3, 4 of the transformer are series connected each to the other, and a terminal 5 of secondary winding 3 is grounded. Node 6, common to the two secondary windings, is connected to the anode of diode 7, whose cathode is connected to an output terminal U2. A capacitor 8 is connected between terminal U2 and ground. The terminal 9 of secondary winding 4 is connected to the anode of a diode 10, whose cathode is connected to an output terminal U1. A capacitor 11 is connected between U1 and ground.

The voltage/current pulses induced in the secondary windings charge the capacitors to voltage levels V1, V2 respectively appearing between output terminals U1, U2 and ground. A comparator circuit 12 receives voltage V1, compares it with a reference voltage and generates an error signal ERR, which is forwarded to control logic 13. The control logic 13 applies a signal to the base of transistor 2 which controls the frequency or the duty cycle of the voltage pulses applied to the primary winding, thus regulating voltage V1 at a predetermined value.

It is clear that for predetermined load conditions L1, L2 on the outputs, the ratio V2/V1 between the two output voltages is equal to the ratio between the turn number of the secondary winding 3 and the sum of the turn numbers of the windings 3 and 4. Therefore, voltage V2 is indirectly regulated.

However, if the load L1 decreases below a predetermined value whilst load L2 remains constant, voltage V2 drops below the indirect regulation value. At the extreme, if load L1 goes to zero and power dissipation in the components is neglected, no power has to be transferred to capacitor 11, and the frequency or duty cycle of the voltage pulses induced in the secondary windings must virtually drop to zero. As a consequence voltage V2 virtually drops to zero. Conversely, V2 will rise above a nominal indirect regulation value if L2 decreases and L1 is non-zero). Normally, a power supply of the described type finds use in equipment where the loads powered by the two outputs are relatively constant.

Power supplies of this type are also used in data processing system peripheral units, such as printers, diskette drivers, and the like. In these units the voltage V2, of lower value and typically $+5$ v, is used to power a relatively constant load consisting of logic control circuits. Voltage V1, having a higher value typically between $+15$ v and $+40$ v, is used to feed power devices, such as motors and electromagnetic actuators, which constitute broadly variable loads. In this case and in order to avoid broad changes in voltage V2 depending on L1, it is essential to assure that L1 is kept relatively constant. This is achieved by connection of a fixed resistive load R1 between terminal U1 and ground so that the relative change of the total load R1+L1 is contained within acceptable limits.

It is well known that such an arrangement reduces the efficiency of the power supply, requires an oversizing and causes power waste and development of heat which must be dissipated.

FIG. 2 shows a second arrangement, known in the prior art, which provides a partial solution of the problem. Since this arrangement is very similar to that shown in FIG. 1, equivalent elements in both figures are referenced with the same numerals. In FIG. 2, terminal 5 of secondary winding 3 is grounded. The other terminal 14 is connected to the anode of diode 7 whose cathode is connected to terminal U2. A capacitor 8 is connected between U2 and ground. Terminal 15 of secondary winding 4 is connected to U2, and its other terminal 9 is connected to the anode of diode 10 whose cathode is connected to output terminal U1. A capacitor 16 is connected between terminals U1, U2.

Thus, the voltage V1 available between terminal U1 and ground is the sum of the charging voltage of the two capacitors 16, 8 and is applied to comparator 12. In this case also, voltage V1 is directly regulated, and voltage V2 is indirectly regulated. However, by this arrangement the two outputs are dynamically coupled: every change in voltage V2 also affects voltage V1 so that the indirect regulation is more effective. As a drawback, the diode 7 must supply the full current required to feed both load L2 and load L1. Therefore is must be correspondingly highly rated. Further, the output U2 is affected by the ripple voltage due to the impulsive loading of capacitor 8 and in addition by the whole ripple voltage affecting output U1 (capacitor 8 receives power needed by load L1 and transfers such power to load L1).

This ripple voltage may be unacceptable if, as is often the case, most of the power must be supplied to output U1 which is at a voltage higher than V2. A ripple voltage in the order of 5% at an output averaging 30 v (equal to 1.5 v in absolute value), when transferred to an output averaging 5 v, results in a ripple voltage in the order of 30% which is unacceptable.

A further problem occurs in case power peaks are drained from output U1, which peaks may exceed the maximum regulating range of the power supply. Temporary overloads are not unusual events in the operation of computer peripheral units because it is not economical to size a power supply so as to perform regulation even in case of temporary overloading. In these circumstances, voltage V1 may fall well below the normal regulation value and cause a corresponding decrease of voltage V2. If the decrease of V1 may be tolerated, the decrease in V2 may nonetheless hamper the correct operation of the logical circuits.

These drawbacks are overcome by the embodiment of FIG. 3 in which the elements functionally equivalent to the ones of FIGS. 1 and 2 are referenced by the same numbers. In FIG. 3, the secondary winding 3 is series connected to secondary winding 4 (as in FIG. 1). The terminal 5 of secondary winding 3 is grounded, and the common node of the two secondary windings is connected to the anode of diode 7 whose cathode is connected to output U2. A capacitor 8 is connected between U2 and ground. The terminal 9 of secondary winding 4 is connected to the anode of diode 10, whose cathode is connected to the output terminal U1. A capacitive element, two series connected capacitors 17, 18, is connected between terminal U1 and ground. Voltage V1, available between terminal U1 and ground is applied to comparator circuit 12 which forwards an error signal to the control circuits 13 of the switching transistor 2.

In this configuration also, voltage V1 is directly regulated, and voltage V2 is indirectly regulated. The node 19, common to the two capacitors 17, 18, is connected to the anode of a diode 20, whose cathode is connected to terminal U2. The capacitances of the two capacitors 17, 18 are selected so that the voltage at node 19 is equal or slightly higher than voltage V2. This result can be easily obtained because it is well known that a charging voltage applied to two series connected capacitors is distributed between the two capacitors so that the ratio of the charge voltages is inversely proportional to the ratio of the respective capacitances.

With this configuration, even if no load L1 or a minimum load L1 is connected to output U1, any voltage decrease at terminal U2 causes the forward biasing of diode 20 and a current flow from node 19 which tends to discharge capacitor 18, thus decreasing the value of V1. In other words a fraction of the power required by load L2, which is not supplied by capacitor 8, is supplied by capacitor 18 which sustains voltage V1 and causes the intervention of the control circuits which increase the power transferred from the primary to the secondary windings, thus keeping voltage V1 at the regulation level. (Diode 7 may be sized to sustain the maximum load L1 as in the case of FIG. 2.)

Moreover, the ripple voltage of U1 is transferred to output U2 to a reduced extent only. First, because only a fraction of the ripple voltage equal to the ratio between the voltage at node 19 ($\approx$V2) and voltage V1 is applied to the anode of diode 20 and second because this fraction is largely clipped by the diode (as a limit, when the diode is non-conductive the filtering is total). In case of a temporary overload at output U1 and V1 voltage drop as to regulation value, diode 20 is reverse biased, and no energy transfer occurs from capacitor 8 towards capacitor 18. Therefore V2 does not collapse.

It must be noted that the voltage at node 19, relative to voltage V1 is completely defined by the capacitance of capacitors 17, 18 only in the case of theoretically perfect capacitors. In practice, real capacitors always exhibit a small leakage current and act as perfect capacitors having a resistance in parallel. This fact may cause a drift of the voltage at node 19. To prevent node 19 from dropping below a predetermined voltage value, a resistor 21 may be connected in parallel with capacitor 17. The value of such resistor, which may be very high, is selected so that the voltage applied to its terminals causes a current flow having the same order of magnitude as the maximum foreseeable leakage current of capacitor 18. In this way, the voltage at node 19 is maintained at least at the level of voltage V2, plus the voltage drop in diode 20, except in case of transient overloads.

It will be understood that the preceding description relates to a preferred embodiment and that several changes can be made. In particular, the circuits which convert an unregulated d-c voltage into voltage pulses applied by means of a transformer to two filtering buffer elements which sustain the voltage at two outputs are examples only. It is clearly possible to use control circuits which apply voltage pulses of opposite value to the primary winding of a transformer. It is also possible to apply voltage pulses of opposite direction to either one or the other of two primary windings depending on the direction of the pulses. In both cases, voltage pulses of opposite polarity are obtained at the secondary windings. These pulses may be rectified with diode bridges with the result applied to output filtering and buffering capacitors. As in the case of the primary winding, the secondary windings too may consist in two winding halves coupled to diode half-bridges for rectifying the voltage pulses of opposite polarity induced in the windings and for applying the results to the output filtering capacitors.

Therefore the invention may be used in all kinds of power supplies where voltage pulses input to a transformer primary winding induce voltage pulses in secondary windings, the induced voltage pulses charging at least two capacitive filtering elements which sustain two distinct output voltages, one of which provides a feedback signal for controlling parameters of the input pulses, such as frequency and/or duty cycle, thus achieving regulation of one of the two output voltages. It is also clear that even if reference has been made, in the description, to positive voltages, the invention may be used also in the case of negative voltages, by reversing the conductive direction of the diodes in the circuit.

What is claimed is:

1. A multiple output switching power supply providing a first directly controlled output voltage between a first output and ground and indirect control of at least a second output voltage between a second output and ground, comprising a transformer having at least a primary winding and at least two secondary windings, periodical voltage pulses being induced in said secondary windings, said voltage pulses loading, through rectifying elements, a first capacitive element, having a grounded terminal, at a first voltage V1 and a second capacitive element, having a grounded terminal, at a voltage V2 having the same polarity as V1 but having a lower value, said voltages being available, for powering loads, respectively at said first output and at said second output, said power supply being characterized in that:

said first capacitive element comprises a first and a second capacitor, series connected between said first output and ground, the node common to said first and said second capacitor being connected to said second output through a diode, said first and second capacitors having a value such that said first voltage applies to said node a voltage level equal or slightly higher, in absolute value, than said second voltage, said diode being conductive in the direction which allows power flow from said first capacitive element to said second output terminal and said second capacitive element.

2. A power supply as in claim 1 further comprising a resistor connected between said first output and said node common to said first and second capacitor.

* * * * *